(12) United States Patent
Hanaoka et al.

(10) Patent No.: US 11,735,223 B2
(45) Date of Patent: Aug. 22, 2023

(54) HEAD SUSPENSION SYSTEM FOR A TAPE DRIVE

(71) Applicant: Western Digital Technologies, Inc., San Jose, CA (US)

(72) Inventors: Koumei Hanaoka, Odawara (JP); Masahito Kobayashi, Ushiko (JP)

(73) Assignee: Western Digital Technologies, Inc.

( * ) Notice: Subject to any disclaimer, the term of this patent is extended or adjusted under 35 U.S.C. 154(b) by 29 days.

(21) Appl. No.: 17/361,997

(22) Filed: Jun. 29, 2021

(65) Prior Publication Data
US 2022/0415358 A1 Dec. 29, 2022

(51) Int. Cl.
*G11B 21/24* (2006.01)
*G11B 5/127* (2006.01)

(52) U.S. Cl.
CPC ............. *G11B 21/24* (2013.01); *G11B 5/127* (2013.01)

(58) Field of Classification Search
CPC ....... G11B 5/5504; G11B 5/584; G11B 21/24; G11B 5/127
See application file for complete search history.

(56) References Cited

U.S. PATENT DOCUMENTS

| | | | |
|---|---|---|---|
| 4,583,135 A | | 4/1986 | Kimura |
| 4,623,947 A * | 11/1986 | Kasahara | ................ G11B 5/584 |
| 5,191,492 A | 3/1993 | Nayak et al. | |
| 5,280,402 A * | 1/1994 | Anderson | ............ G11B 5/5508 |
| 5,371,636 A * | 12/1994 | Nayak | .................. G11B 5/5504 |
| 5,377,052 A * | 12/1994 | Guzman | ................ G11B 5/584 |
| 5,379,170 A * | 1/1995 | Schwarz | .............. G11B 5/5504 |
| 5,438,469 A * | 8/1995 | Rudi | ........................ G11B 5/584 |
| 5,508,865 A * | 4/1996 | La Garcia | .............. G11B 5/584 |
| 5,566,039 A * | 10/1996 | Spicer | ................... G11B 5/5504 360/291 |
| 5,602,688 A * | 2/1997 | Yokoyama | ............. G11B 15/43 |

(Continued)

FOREIGN PATENT DOCUMENTS

| | | |
|---|---|---|
| CN | 1350687 A | 5/2002 |
| CN | 1501380 A | 6/2004 |

(Continued)

OTHER PUBLICATIONS

Bart Raeymaekers, et al., Microsyst Technol, Feb. 19, 2009, Design of a dual stage actuator tape head with high-bandwidth track following capability, https://link.springer.com/article/10.1007/s00542-009-0800-y.

(Continued)

*Primary Examiner* — Brian E Miller
(74) *Attorney, Agent, or Firm* — Chang & Hale LLP

(57) ABSTRACT

A storage device comprises, a head assembly, motor(s) configured to actuate the head assembly. The storage device may optionally include tape reel(s) holding tape media for storing data and a casing. The head assembly and its suspension system comprises a support structure, a head housing having an upper attachment bracket and a lower attachment bracket, a first flat spring attached to the upper attachment bracket, a second flat spring attached to the lower attachment bracket, and a head bar attached on an upper side to the first flat spring and attached on a lower side to the second flat spring. The head bar includes at least one read head and at least one write head.

19 Claims, 10 Drawing Sheets

(56) References Cited

U.S. PATENT DOCUMENTS

| | | | |
|---|---|---|---|
| 5,726,834 A * | 3/1998 | Eckberg | G11B 5/5504 360/291 |
| 5,739,970 A | 4/1998 | Kobayashi et al. | |
| 5,793,573 A * | 8/1998 | Eckberg | G11B 5/5504 |
| 5,818,668 A | 10/1998 | Gonzales | |
| 5,828,523 A * | 10/1998 | Takeuchi | G11B 5/584 |
| 5,883,770 A | 3/1999 | Biskeborn et al. | |
| 5,949,619 A * | 9/1999 | Eckberg | G11B 5/5504 360/291 |
| 5,978,188 A | 11/1999 | Kaaden et al. | |
| 5,982,592 A | 11/1999 | Saito et al. | |
| 6,043,958 A * | 3/2000 | Kaaden | G11B 5/5504 360/291.1 |
| 6,411,474 B1 * | 6/2002 | Anderson | G11B 5/56 |
| 7,054,101 B1 | 5/2006 | Marion et al. | |
| 7,221,534 B2 | 5/2007 | Anderson et al. | |
| 7,289,300 B2 | 10/2007 | McCarthy | |
| 7,359,160 B2 * | 4/2008 | Koga | G11B 5/5504 360/291 |
| 9,355,663 B1 * | 5/2016 | Harper | G11B 5/584 |
| 9,672,870 B1 | 6/2017 | Mizumoto et al. | |
| 9,805,751 B1 * | 10/2017 | Yeakley | G11B 5/5504 |
| 10,783,924 B2 | 9/2020 | Olson et al. | |
| 10,957,362 B1 * | 3/2021 | Harper | G11B 5/584 |
| 10,991,390 B2 * | 4/2021 | Kobayashi | G11B 33/14 |
| 11,056,139 B2 * | 7/2021 | Harper | G11B 5/584 |
| 11,295,771 B2 * | 4/2022 | Sakagami | G11B 5/4893 |
| 2003/0103297 A1 | 6/2003 | Jones | |
| 2003/0235011 A1 | 12/2003 | Rubas et al. | |
| 2005/0162781 A1 * | 7/2005 | McCarthy | G11B 5/5552 |
| 2005/0185344 A1 * | 8/2005 | Ito | G11B 5/584 |
| 2005/0201017 A1 | 9/2005 | Koga | |
| 2006/0186756 A1 | 8/2006 | Langlois et al. | |
| 2006/0198506 A1 | 9/2006 | Miller | |
| 2006/0290212 A1 * | 12/2006 | Inoguchi | G11B 5/56 |
| 2007/0008683 A1 | 1/2007 | Gavit et al. | |
| 2008/0198506 A1 * | 8/2008 | Weng | G11B 5/5504 360/101 |
| 2009/0067097 A1 | 3/2009 | Biskeborn et al. | |
| 2009/0116140 A1 * | 5/2009 | Harper | G11B 5/584 360/77.12 |
| 2009/0141389 A1 | 6/2009 | Saliba | |
| 2009/0180214 A1 | 7/2009 | Solhjell | |
| 2009/0201603 A1 | 8/2009 | Bui et al. | |
| 2010/0232064 A1 | 9/2010 | Lim et al. | |
| 2010/0302677 A1 | 12/2010 | Bates et al. | |
| 2010/0309579 A1 * | 12/2010 | Nayak | G11B 5/584 360/75 |
| 2011/0255195 A1 | 10/2011 | Poorman et al. | |
| 2018/0211687 A1 * | 7/2018 | Yeakley | G11B 5/48 |
| 2020/0258544 A1 * | 8/2020 | Kobayashi | G11B 21/027 |
| 2021/0249042 A1 * | 8/2021 | Kobayashi | G11B 25/063 |

FOREIGN PATENT DOCUMENTS

| | | |
|---|---|---|
| CN | 1920955 A | 2/2007 |
| CN | 101271692 A | 9/2008 |
| JP | S55139630 A | 10/1980 |
| JP | S5897129 A | 6/1983 |
| JP | H1079153 A | 3/1998 |
| JP | H10241232 A | 9/1998 |
| JP | 2005267684 A | 9/2005 |
| JP | 2005346793 A | 12/2005 |
| JP | 2013513194 A | 4/2013 |
| JP | 2016508657 A | 3/2016 |
| JP | 2016524774 A | 8/2016 |

OTHER PUBLICATIONS

Mark A. Lantz, IBM Research, Advanced tape technologies, https://www.zurich.ibm.com/sto/tape/servo/actuator.html.

Uwe Boettcher, et al., Dynamic Modeling and Control of a Piezo-Electric Dual-Stage Tape Servo Actuator, Jul. 2009, IEEE Transactions on Magnetics, vol. 45, No. 7, https://www.researchgate.net/publication/224516823_Dynamic_Modeling_and_Control_of_a_Piezo-Electric_Dual-Stage_Tape_Servo_Actuator.

* cited by examiner

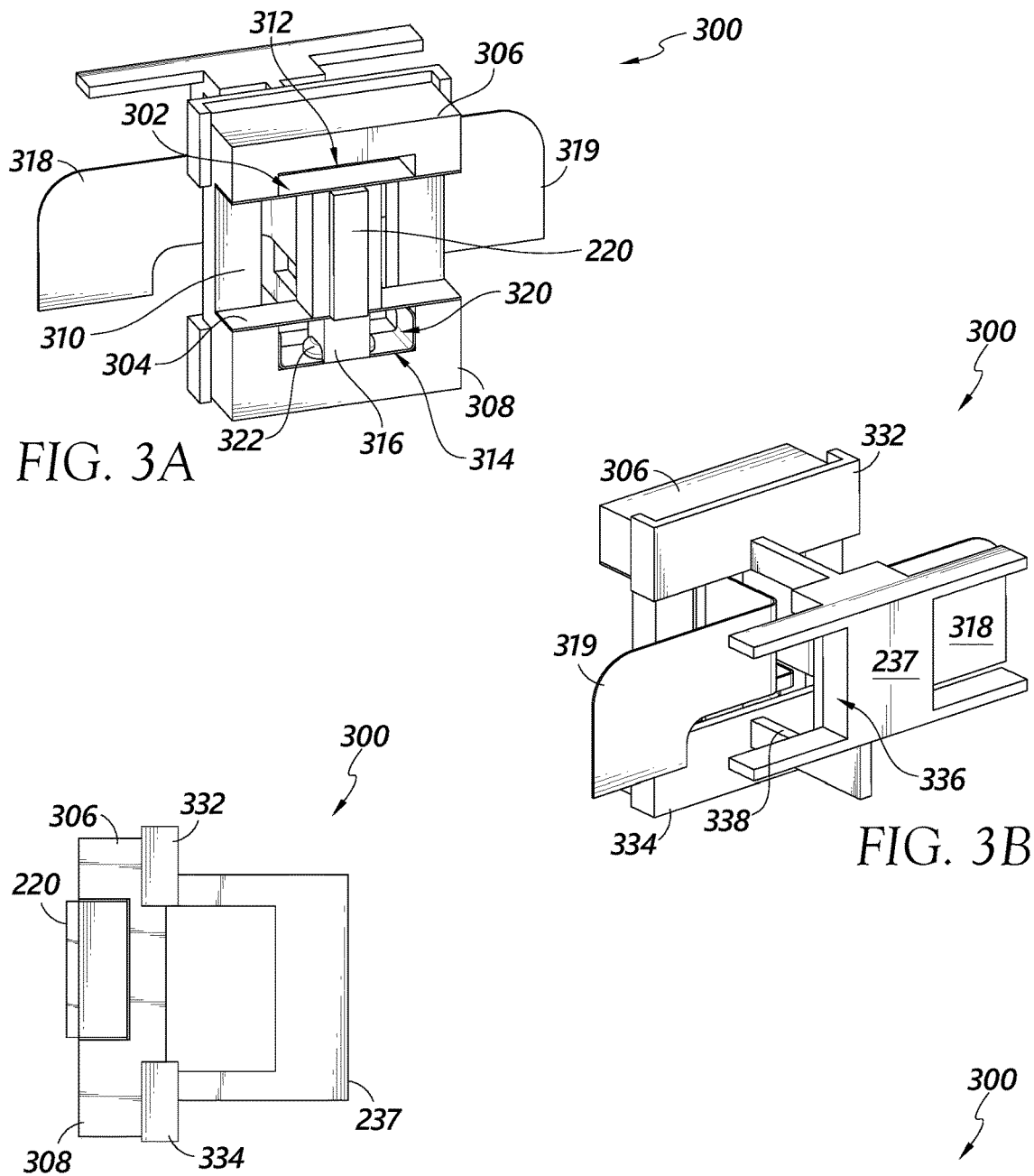
FIG. 3A
FIG. 3B
FIG. 3C
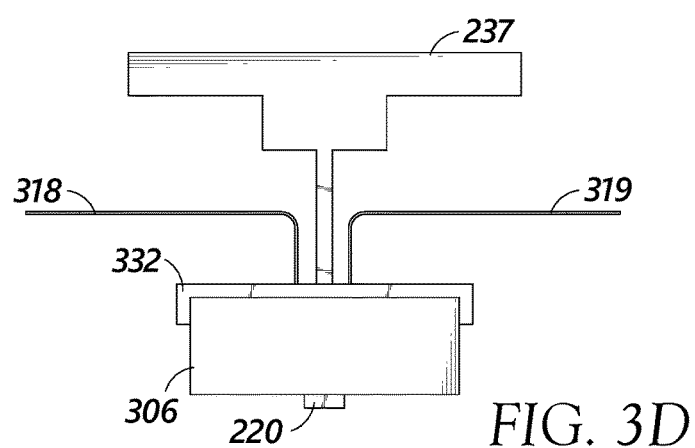
FIG. 3D

HEAD SUSPENSION SYSTEM FOR A TAPE DRIVE

BACKGROUND

Field

This disclosure relates to tape-based data storage devices. More particularly, the disclosure relates to a data storage device with a tape-based reading and writing mechanism.

Description of Related Art

In certain computing systems, tape storage systems comprise of a tape drive and tape cartridges or cassettes that store tape media (also called tape film or magnetic tape). The tape drive performs writing or reading of data in the cartridges or cassettes.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIGS. 3A-3D illustrate various views of the head bar portion (referred to as a head bar assembly) of the head assembly of FIG. 2, according to certain embodiments.

DETAILED DESCRIPTION

Figure 1A:
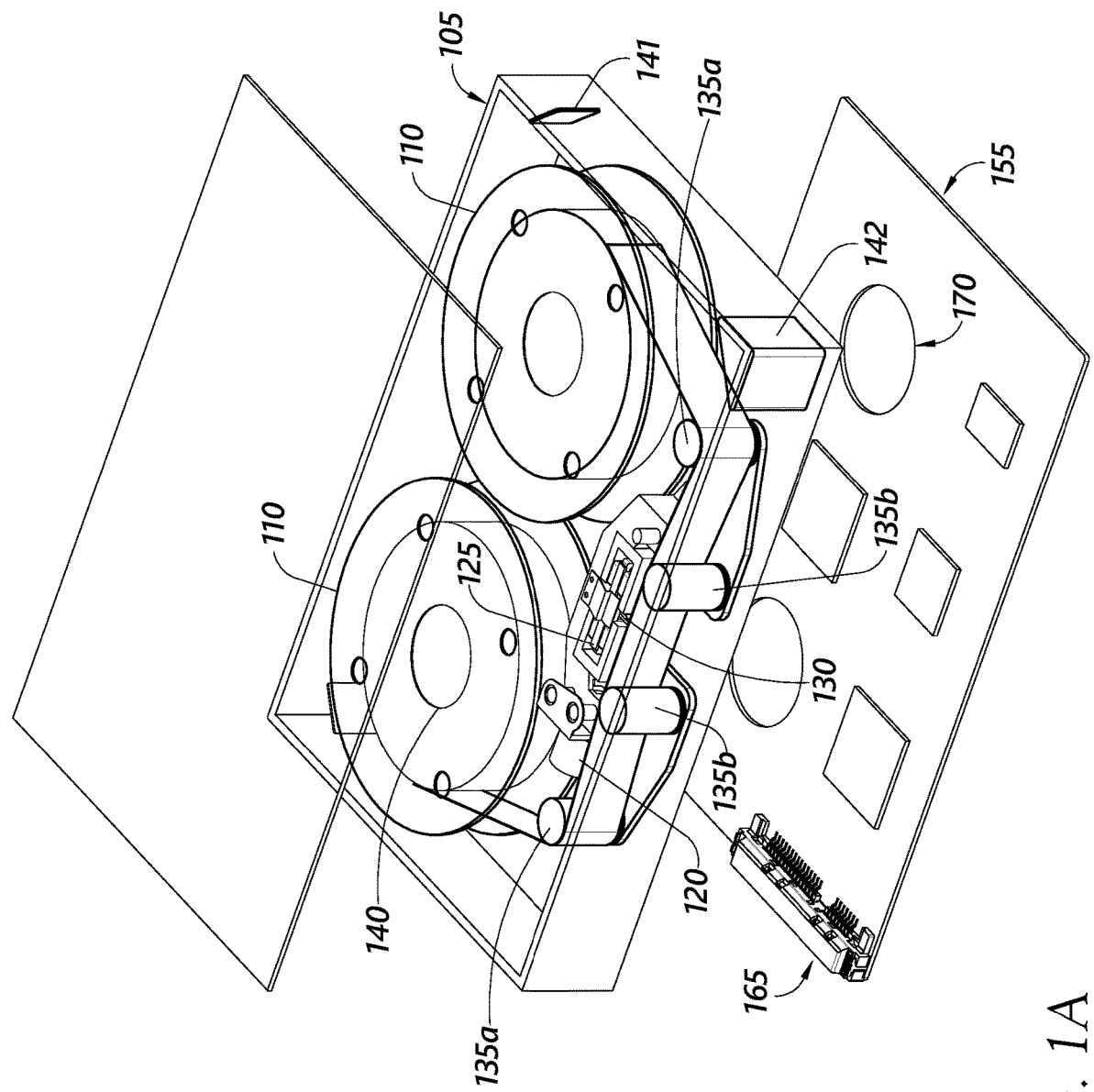
FIGS. 1A-1C illustrate a perspective exploded view, a top down, and a side profile view of a tape embedded drive, according to certain embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Although the principles disclosed herein may be applicable to any suitable or practical data storage system or environment, for convenience, certain embodiments are disclosed herein in the context of tape-based data storage systems.

Tape data storage is a system for storing digital information on magnetic tape using digital recording. Tape storage media is most commonly packaged in cartridges and cassettes. A tape drive performs writing or reading of data in the cartridges or cassettes. Autoloaders and tape libraries can be used to automate cartridge handling by moving cartridges/cassettes from a library of cartridges to the tape drive and vice versa. A common cassette-based format is Linear Tape-Open (LTO), which comes in a variety of densities.

In the context of magnetic tape, the term cassette usually refers to an enclosure that holds two reels with a single span of magnetic tape. The term cartridge is more generic, but frequently means a single reel of tape in a plastic enclosure. For convenience, the disclosure will refer to cassettes, but the described technology can also be applied to cartridges.

The type of packaging is a large determinant of the load and unload times as well as the length of tape that can be held. A tape drive that uses a single reel cartridge has a take-up reel in the drive while cassettes have the take-up reel in the cassette. A tape drive (or "transport" or "deck") uses precisely controlled motors to wind the tape from one reel to the other, passing a read/write head as it does.

Current tape drive library systems have several deficiencies. As tapes are open to the environment, the tape storage facility (e.g., data center) needs to control the humidity and temperature to ensure the reliability of the tape. Such environmental maintenance can be expensive. In addition, even with such maintenance, long-term reliability can still be a problem. For example, variances in temperature or contamination from dust could affect the reliability of the tape drives.

In addition, the robotics used to move a tape cassette from a tape holder in the library to the tape drive system can cause additional delay in reading. For example, access time for both robotics (about average 50 s) and tape drive (about average 50 s) can be about 100 s.

Furthermore, the tape drive system uses an up/down stepping motor and voice coil motor (VCM), called dual stage motors, to move a large writer and reader head bar. At higher tracks per inch (TPI), the large head bar limits the accuracy possible with the dual stage motors. Additionally, the tape drive system needs to support multiple generations of cassettes. The tape drive system may need to write and read data for several types of tape film vendors and recording generations. Maintaining compatibility can limit the possibility of technology improvement.

Tape Embedded Drive Overview

One possible solution to these problems is a tape embedded drive, embodiments of which are discussed below. The tape embedded drive is, in some embodiments, a cassette that integrates the tape media and the head(s) for reading and writing. As the head(s) are embedded in the cassette, a separate tape drive becomes unnecessary. Further, the cassette can utilize, for example, the 3.5 inch form factor common to hard disk drives (HDD). By using the 3.5 inch form factor, technologies developed for HDDs such as controllers and sealed drive technology can be adapted or otherwise utilized for tape drives. For example, a similar printed circuit board assembly (PCBA) used in HDD drives could be used, providing a SATA or a SAS interface to the host. Further, the PCBA can comprise a system-on-a-chip (SoC) and/or other control circuitry, including, for example, data read channel, memory, motor driver(s) and actuator driver(s). Integrating the head technology can eliminate the need for maintaining a tape library system, including the associated maintenance costs.

In addition, using a standardized form factor such as the 3.5 inch form factor can provide better integration with existing data center infrastructure. HDDs are commonly used in data centers for storage, with specialized racks and servers designed to utilize 3.5 inch form factor HDDs. By using the 3.5 inch form factor, the tape embedded drive can simplify the maintenance and infrastructure needs of data centers. Rather than having a second set of infrastructure for supporting tape drives, the data center could utilize the same infrastructure to support both HDDs and tape embedded drives such as those described in this disclosure. In certain other embodiments, the same integrated approach can be applied to a non-3.5 inch form factor construction. For example, a 2.5 inch or 5.25 inch form factor may be used, or another generally rectangular form factor may be used. Using a 2.5 inch or 5.25 inch form factor may also provide the same infrastructure and other benefits mentioned above with respect to the 3.5 inch form factor.

For fine movement, a head assembly of the tape embedded drive can include piezoelectric actuators. Meanwhile, a VCM and a stepping motor can provide progressively larger movement. For example, the piezoelectric actuator may provide for movement in the micrometers (e.g., ~2 μm), while the VCM provides for movement in the millimeters. A suspension system for the heads can facilitate movement of the heads. However, if the suspension system is too flexible, the heads may move even when not desired. Ideally, the heads would move only to reach a new position over the tape media but would then remain stable over the new position.

Having a stiffer suspension system for the head(s) of the tape embedded drive can reduce unwanted movement of the head(s). In some particular embodiments, a head assembly of the tape drive suspends a head bar having one or more heads between two suspension mechanisms or head springs, such as flat springs. Flat springs provide a beneficial characteristic of having greater stiffness for side-to-side motion, while having more flexibility for up and down motion. By aligning the length of the flat spring along the length of the tape media, unwanted side-to-side movement is reduced while facilitating lateral head movement across tracks. This can increase potential bandwidth, for example, by allowing the head to move to a desired track faster.

A piezoelectric actuator can be placed below a flat spring, opposite an end of the head bar to move the flat spring and the attached head bar. The piezoelectric electric actuator allows the head assembly to provide fine movement control over the head bar, while other actuators allow the head assembly to move over larger distances. In some embodiments, the head bar is fixed to the flat spring, the piezoelectric actuator and the flat spring are fixed to an attachment bracket, and the attachment bracket is supported by a head housing. Such a configuration can improve stiffness, which can reduce undesired movement of the head bar.

Piezoelectric actuators are devices that produce a small displacement with a high force capability when voltage is applied. There are many applications where a piezoelectric actuator may be used, such as ultra-precise positioning and in the generation and handling of high forces or pressures in static or dynamic situations. Actuators can be made in various styles, such as a planar disk, rings, block, disk bender, and bimorph styles.

Operating a piezoelectric actuator requires an electrical input, or driving signal, with certain appropriate characteristics. The two main components of the electrical input are the drive frequency and voltage amplitude. The frequency determines how fast the piezoelectric actuator will vibrate or change state. A piezoelectric actuator capable of operating at higher frequencies is more responsive, which can increase the bandwidth of the tape embedded drive as the head can be moved to its target destination more quickly. In addition, a more responsive actuator can correct for errors more quickly, allowing the position error signal (PES) (which provides an estimate of the difference between the head position and the desired track) to be reduced. Piezoelectric actuators may be ultrasonic, capable of producing strokes of several micrometers at ultrasonic (>20 kHz) frequencies. In one embodiment, the piezoelectric actuator is configured to operate at 40 kHz-50 kHz.

Figure 1B:
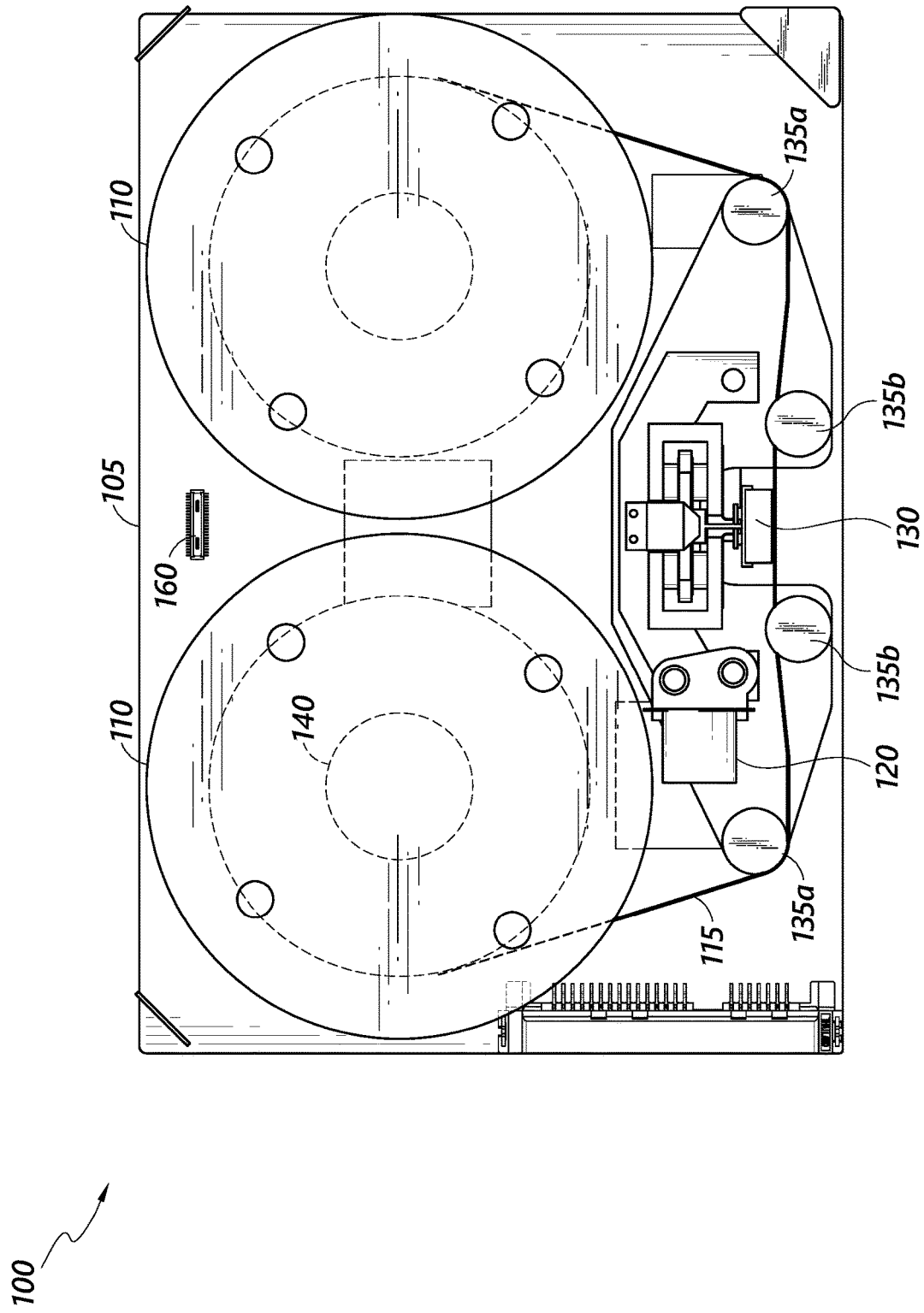
Figure 1C:
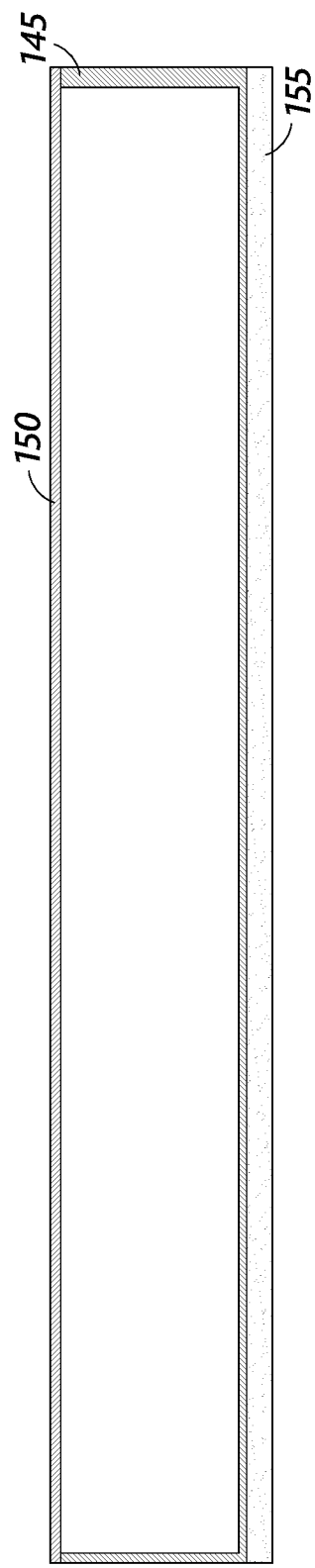

FIGS. 1A-1C illustrate a perspective exploded view, a top down view, and a side profile view of a tape embedded drive 100, according to certain embodiments. Focusing on FIG. 1A, the tape embedded drive comprises a casing 105, one or more tape reels 110, tape media 115, one or more motors (e.g., a stepping motor 120 (also known as a stepper motor), a voice coil motor 125, etc.), a head assembly 130 with one or more read and write heads, tape guides/rollers 135a, 135b and PCBA 155. In an embodiment, most of the components are within an interior cavity of the casing, except the PCBA which is mounted on an external surface of the casing. The same components are illustrated in FIG. 1B, which shows a top down view of the tape embedded drive 100 without a top cover 150.

The enclosed nature of the tape embedded drive 100 allows great leeway in placement of the internal components. For example, in the illustrated embodiment, the tape reels 110 are essentially along the same horizontal line. The reels are close to a top edge of the casing, providing space along the bottom edge of the casing for other internal components, such as motors and the head(s). However, other embodiments can have the tape reels in different locations. For example, the tape reels 110 may be diagonal from each other, with the right tape reel in the top right corner and the left tape reel on the bottom left corner or with the right tape reel in the bottom right corner and the left tape reel on the top left corner. Spaces in the empty corners can be used for other components.

In the illustrated embodiment, two tape reels 110 are placed in the interior cavity of the casing, with the center of the two tape reels on the same level in the cavity. The head assembly 130 is located in the middle and below of the two tape reels. Tape reel motors 140 located in the spindles of the tape reels can operate to wind and unwind the tape film in the tape reels. Each tape reel may also incorporate a tape folder to help the tape film be neatly wound onto the reel. The tape media may be made via a sputtering process to provide improved areal density.

Tape film from the tape reels can be biased against the guides/rollers 135a, 135b and movably passed along the head assembly 130 by movement of the reels. The illustrated embodiment shows four guides/rollers 135a, 135b, with the two guides/rollers 135a furthest away from the head assembly 130 serving to change the direction of the film and the two guides/rollers 135b closest to the head assembly 130 keeping the film under tension as it passes by the head assembly 130.

As shown in FIG. 1A, in some embodiments, the guides/rollers 135 utilize the same structure. In other embodiments, the guides/rollers 135 may have more specialized shapes and differ from each other based on function. Furthermore, a lesser or greater number of rollers could be used. For example, the two functional rollers may be cylindrical in shape, while the two functional guides may be flat-sided (e.g., rectangular prism) or clip shaped with two prongs and the film moving between the prongs of the clip.

The voice coil motor and stepping motor can variably position the tape head(s) transversely with respect to the width of the recording tape. The stepping motor can provide coarse movement while the voice coil motor can provide finer actuation of the head(s). In an embodiment, servo data can be written to the tape to aid in more accurate positioning of the head(s) along the tape film.

In addition, the casing 105 can comprise one or more particle filters 141 and/or desiccants 142 (FIG. 1A) to help maintain the environment in the casing. For example, if the casing is not airtight, the particle filters may be placed where airflow is expected. The particle filters and/or desiccants can be placed in one or more of the corners or any other convenient place away from the moving internal components. For example, the moving reels may generate internal airflow as the tape winds/unwinds, and the particle filters can be placed within that airflow.

There is a wide variety possible in the placement of the internal components of the tape embedded drive 100 within the casing. In particular, as the head mechanism is internal to the casing in certain embodiments, the film does not ever have to be exposed outside of the casing, such as in conventional tape drives. Thus, the tape film does not need to be routed along the edge of the casing and can be freely routed in more compact or otherwise more efficient ways within the casing. Similarly, the head(s) and tape reels can be placed in a variety of locations to achieve a more efficient layout, as there is no design requirement to provide external access to these components.

As shown in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside the casing for other components, particularly the moving components and film media that benefit from a more protected environment. However, other embodiments may place the PCBA in a different location, such as the top, the sides, or within the casing.

In some embodiments the tape embedded drive 100 is sealed. Sealing can mean the drive is hermetically sealed or simply enclosed without necessarily being airtight. Sealing the drive can be good for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen or some other typically inert gas.

In some embodiments, other components can be added to the tape embedded drive 100. For example, a pre-amp for the heads can be included in the drive. The pre-amp may be located on the PCBA 155, in the head assembly 130, or in another location. In general, placing the pre-amp closer to the heads can have a greater effect on the read and write signals in terms of signal-to-noise ratio (SNR). In other embodiments, some of the components shown in the illustrated embodiment could be removed. For example, the filters 141 or the desiccant 142 may be left out.

In the illustrated embodiment, the PCBA 155 is attached to the bottom surface of the casing, with a connector (not shown) attaching to contacts or an interface 160 (in FIG. 1B) on the bottom surface electrically/electronically connected to internal components in the casing. For example, the contacts or interface 160 may be electrically connected to one or more motors and/or actuators within the casing. In an embodiment, the contacts/interface are built into the casing without compromising an air tight seal of the casing. In some embodiments, the connector 160 can be an electrical feed-through electrically connecting components inside the casing to those on the PCBA, while maintaining sealing of the casing. For example, an electrical feed-through similar to those found in sealed helium disk drives can be used, such as that described in U.S. Pat. No. 9,672,870, titled "Sealed bulkhead electrical feed-through X-Y positioning control," issued on Jun. 6, 2017, and assigned to the assignee of this disclosure, the disclosure of which is incorporated by reference.

The PCBA 155 can include various components, such as one or more controllers, one or more interfaces 165, an SoC, one or more data interfaces 165 (e.g., Serial ATA (SATA), Serial Attached SCSI (SAS), non-volatile memory express (NVMe) or the like), memory, a Power Large Scale Integration (PLSI), and/or data read channel controller. One or more cutouts 170 can be added in the PCBA to provide additional space for tape reel motors, if needed. For example, the portion of the casing above the tape reel motors 140 may be raised to provide additional space for the motors. By providing cutouts 170, the thickness of the tape embedded drive 100 can be reduced as the PCBA 155 can surround the raised portion of the casing.

The PCBA 155 can extend along the entire bottom exterior surface of the casing 105 or may only partially extend along the surface, depending on how much space the various components need. In some embodiments, a second PCBA may be located internally in the casing 105 and be in communication with the first PCBA 155, for example, via the interface 160 (shown in FIG. 1B).

In some embodiments, a controller on the PCBA controls the read and write operations of the tape embedded drive 100. The controller can engage the tape spool motors and cause the tape spools to wind the tape film forward or backwards. The controller can use the stepping motor and the voice coil motor to control placement of the head(s) over the tape film. The controller can also control output/input of data to or from the tape embedded drive 100 through the one or more interfaces 165 such as NVMe/PCIe, SATA or SAS.

It is noted that while the tape drive is shown as having embedded tape for illustrative purposes, the head assembly embodiments of the invention can be applied in various forms of tape drives, including a drive where the tape media is insertable such as in a media cartridge. One example is tape drives and media conforming to the LTO standard, and the various drive illustrations shown would be similar to such a drive when the media is fully inserted and engageable for data access. As such, the following disclosure will refer to drive 100 as "the tape drive 100" to cover the various possible tape drive environments, and "the tape embedded drive 100" for tape embedded drive specific embodiments and description.

Head Assembly

Figure 2:
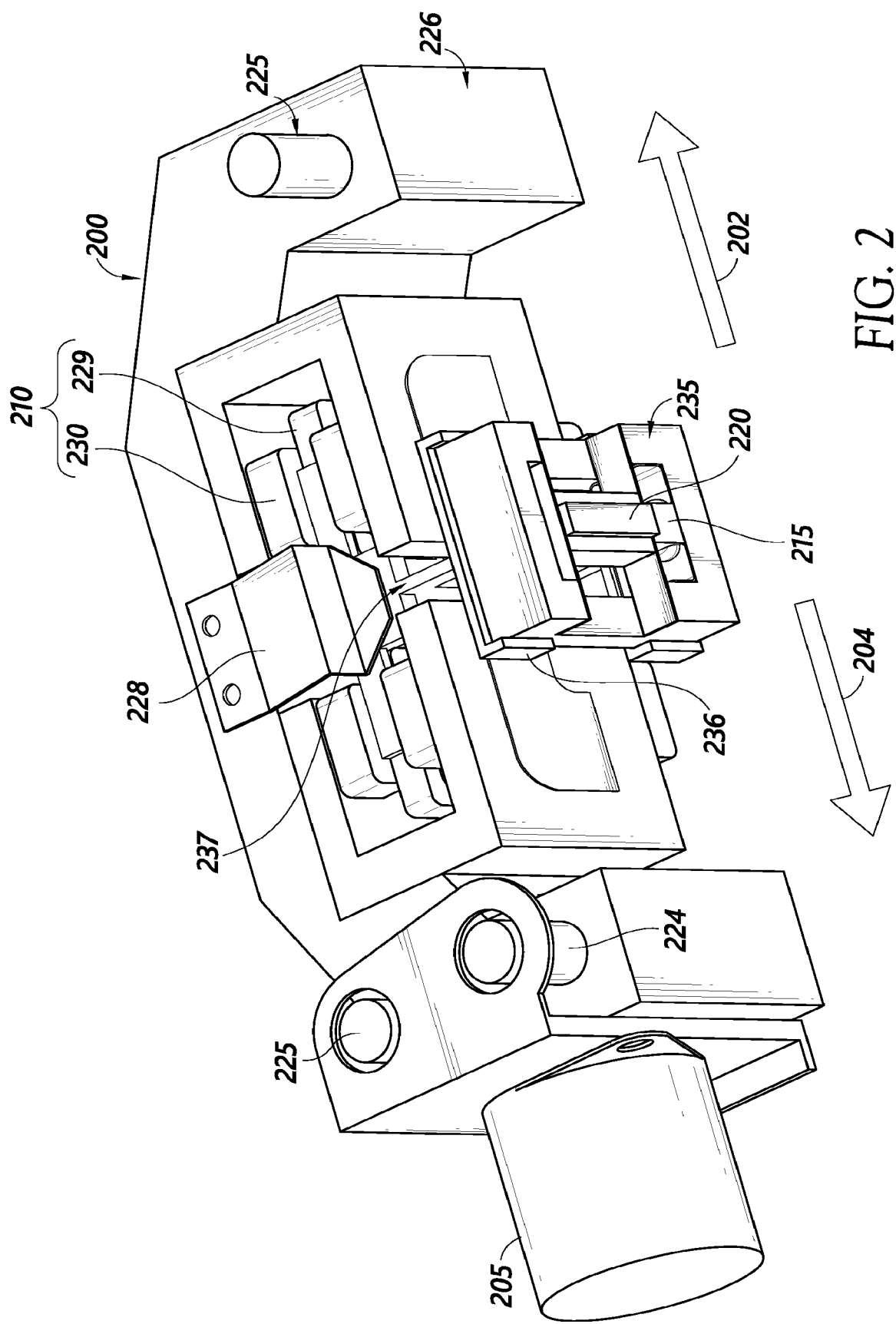
FIG. 2 illustrates a head assembly of the tape embedded drive of FIGS. 1A-1C, according to certain embodiments.

FIG. 2 illustrates a head assembly 200 of the tape drive 100, according to certain embodiments. The head assembly 200 comprises a multi-stage actuator for moving the head assembly. In some embodiments, the multi-stage actuator comprises a stepping motor 205 (first stage), a voice coil motor 210 (second stage) comprising a coil 229 and magnet 230 and a piezoelectric actuator 215 (third stage) which can provide coarse, fine, and ultra-fine actuation, respectively, for up/down movement of a head bar 220. In an embodiment, the piezoelectric actuator is a lead zirconate titanate (PZT) actuator (e.g., shear PZT). While the following embodiments describe using piezoelectric actuators, other types of actuators capable of fine movement may also be used.

By using a 3-stage motor in some embodiments, the movement of the head bar 220 can be more precise. With greater precision, more channels can be supported on the tape film, potentially allowing for greater data density on the tape film. In one embodiment, the head bar comprises heads in a write-read-write layout, similar in layout to conventional tape heads. In another embodiment, the head bar comprises two heads in a read-write layout, similar in layout to HDD heads.

The head assembly 200 can further comprise a screw shaft 225 connecting an actuator block 226 to the stepping motor. The screw shaft 225 and guide shafts 224, 240 can facilitate movement of the actuator block by the stepping motor 205. In some embodiments, a different number of guide shafts are used (e.g., 0, 1, 3+). For example, smaller or lighter actuator blocks may need less support during movement and use only one or even no guide shafts. Meanwhile, larger or heavier actuator blocks could use additional guide shafts or multiple screw shafts.

A suspension assembly 228 can connect the head bar 220 to the actuator block 226. In one embodiment, the suspension assembly includes a mounting plate, a load beam, and a laminated flexure to carry the electrical signals to and from the read and write heads in the head bar. The suspension assembly 228 can also include a coil 229 through which a controlled electrical current is passed. The coil 229 interacts with one or more magnets 230 attached to the actuator block 226 to form a voice coil motor 210 for controllably moving the head bar 220.

In an embodiment, a head support block 235 (also referred to as a head housing 235) connects the head bar 220 and piezoelectric actuator 215 to the suspension assembly 228. The head support block 235 can comprise one or more clamps 236 to secure the head bar 220 and the piezoelectric actuator 215 and a supporting structure 237 perpendicular to the clamp to connect the base to the suspension assembly 228. In an embodiment, the head support block and the actuator form a suspension system that allows the head bar 220 to move across the width of the tape media, in conjunction with the control provided by the voice coil motor 210 and the stepping motor 205.

Note also that the piezoelectric actuator 215 may optionally be a multilayer piezoelectric element, comprising a plurality of piezoelectric material layers sandwiched between conductive (e.g., gold) electrode layers. The piezoelectric actuator 215 may optionally comprise one or more of the many known piezoelectric materials, for example, lead zirconate titanate, lead scandium tantalite, lanthanum gallium silicate, lithium tantalite, barium titanate, gallium phosphate and/or potassium sodium tartrate.

In one embodiment, the piezoelectric actuator 215 extends or contracts along an axis (e.g., up and down), pushing or pulling the head bar in those directions. In one embodiment, a heater (e.g., heating coil) may be incorporated into the head bar 220 in order to cause the head(s) to move closer to the tape film. A touchdown sensor can also be incorporated into the head bar to detect head-film contact and prevent the head bar from touching the tape film.

By allowing the head(s) to move closer to the tape film, the signal strength can be increased. In addition, by allowing the head bar to move away from the tape media, a fast-forward or fast-rewind function can be enabled for the tape drive 100. Arrows 202 and 204 indicate the forward and reverse movement of the tape media. As the head bar is further away from the media, the chances of the media hitting the head bar is decreased even if the tape media is moving faster. By avoiding contact, the reliability of the read and write heads and/or the tape media are maintained.

In order to better secure the head assembly 200 to the casing 105, a second guide shaft 240 may be used. In one embodiment, the first guide shaft 224 is on one side of the actuator block 226 with the second guide shaft 240 on the opposite end of the actuator block 226.

In one implementation, movement of the head bar 220 is accomplished in a 3-stage action. First, the stepping motor makes the screw shaft 225 rotate, causing the actuator block to move up and down the first guide shaft 224 and the second guide shaft 240. This causes the head bar to move across (up and down) the width of a tape film. When current is applied to the VCM coil, the head support block also goes up and down, while being supported by the suspension assembly. When voltage is applied to the piezoelectric actuator 215, the head(s) again move up and down. Working in tandem, the 3-stage action can move the head bar across (up and down) the width of the tape film in coarse, fine or very fine increments. In one embodiment, the 3 stages of movement proceed at around a 30,000/10,000/1 ratio, with the stepping motor 205 capable of moving up to 12.65 mm, the VCM 210 capable of moving up to 4 mm and the piezoelectric actuator 215 capable of moving up to 0.4 μm.

Head Assembly Embodiments

FIGS. 3A-3D illustrate various views of the head bar portion (referred to as a head bar assembly 300) of the head assembly 200 of FIG. 2, according to certain embodiments. Other variations of the head assembly 200 can also work with the tape drive 100. For example, the following examples use piezoelectric actuators, such as shear or push-pull PZTs. However, other types of actuators with similar performance characteristics could be used. In another example, different numbers of piezoelectric actuators (e.g., 1, 2, 3, 4, etc.) could be used instead of the numbers shown. Various materials can be used to create the head bar assembly 300. For example, portions may be made up of stainless steel, aluminum, non-ferrous metals, and/or other materials with the required stiffness and light weight.

FIG. 3A illustrates a front perspective view facing the head bar 220 of the head assembly 200. In the perspective shown, the tape media would pass in front of the head assembly 220, with the side of the head bar 220 shown passing over the tape. One or more read heads and one or more write heads on the head bar 220 can then read data from the tape.

In the illustrated embodiment, the head bar 220 is suspended between an upper flat spring 302 and a lower flat spring 304. An upper end or side of the head bar 220 can be attached to the upper flat spring 302, while a lower end or side of the head bar 220 can be attached to the lower flat spring 304. The upper flat spring 302 and lower flat spring 304 form a suspension system for the head bar 220, allowing fine movement of the head bar 220 with the help of an actuator.

Flat springs are small, typically stamped metal components that function like a spring by controlling deflection within small or restricted spaces. Flat springs comprise material that, when deflected by an external load, store and release energy. Flat springs can be manufactured from high carbon spring steel, nickel-silver, high-nickel alloys, stainless steel, phosphor-bronze, and/or beryllium-copper combinations. While the above embodiment uses flat springs, other embodiments may utilize other suspension mechanisms, such as other types of springs, to suspend the head bar 220.

In some embodiments, the head housing 235 comprises an upper bracket 306 and a lower bracket 308, joined together by a housing body 309. The housing body 310 may include two columns on the right and left sides joining the upper bracket 306 to the lower bracket 308.

In one embodiment, the upper bracket 306 comprises a bar and two legs formed on the end of the bar extending downwards, forming a recess 312 between the legs. The recess may contain one or more components, such as a piezoelectric actuator or dummy mass. In one embodiment, the ends of the upper flat spring 302 are attached to each of the legs of the upper bracket 306, with the central body of the upper flat spring 302 bridging across the recess. The flat springs 302, 304 may be attached chemically (e.g., using adhesives or the like) or mechanically (e.g., using welds, solder, screws, or the like). Having both ends of the flat spring 302 attached to the legs can increase the stiffness of the flat spring, thereby reducing unwanted movement of the attached head bar 220.

In some embodiments, the lower bracket 308 forms a mirror image of the upper bracket 306. The lower bracket 308 can comprise a bar and two legs formed on the end of the bar extending upwards, forming a recess 314 between the legs. The recess may contain one or more components, such as a piezoelectric actuator 316. In one embodiment, the ends of the lower flat spring 304 are attached to each of the legs of the lower bracket 308, with the central body of the lower flat spring 304 bridging across the recess. Having both ends of the flat spring 304 attached to the legs can increase the stiffness of the flat spring, thereby reducing unwanted movement of the attached head bar 220.

In the illustrated embodiment, the piezoelectric actuator 316 is attached to the lower attachment bracket, with the piezoelectric actuator on an opposite side of the lower flat spring 304 from the lower end of the head bar 220. In some embodiments, the piezoelectric actuator 316 may be attached to the upper attachment bracket 306, with the piezoelectric actuator 316 on an opposite side of the upper flat spring 302 from the upper end of the head bar. While the illustrated embodiment shows a single piezoelectric actuator 316, some embodiments may have two or even more piezoelectric actuator. In addition, the actuators may be placed in various configurations, such as one above and one below the head bar 220, two side by side above the head bar, or two side by side below the head bar.

In some embodiments, one or more flexible printed circuits (FPCs) 318, 319 electrically connects the head bar 220 to other components of the tape drive, such as a storage controller. In the illustrated embodiment, a first FPC 318 is routed from the left side of the head assembly 200 to the back of the head bar 220 while a second FPC 319 is routed from the right side of the head assembly 200 to the back of the head bar 220. In one embodiment, the lower recess 314 is lined with FPC material 320 that connects to either or both the first FPC 318 and/or second FPC 319. The FPC material 320 is then electrically connected to other components of the tape drive through the first FPC 318 and/or second FPC 319. Meanwhile, the piezoelectric actuator 316 may be connected to the FPC material 320 through conductive adhesive 322, forming an electrical connection with the FPC material 320 and, through the FPC, to other components of the tape drive, allowing signals to be transferred through the FPC. For example, the storage controller may send electrical signals (e.g., drive frequency and voltage amplitude) through the FPC to the piezoelectric actuator 316 to actuate the head bar 220.

FIG. 3B illustrates a rear perspective view of the head bar assembly 300. The support structure 237 can include one or more clamps 236. As shown, the one more clamps 236 include an upper clamp 332 and a lower clamp 334, the upper and lower clamp configured to attach to the upper bracket 306 and the lower bracket 308, respectively, of the housing body 310. As shown, the clamps are c-clamps with a main body attached to a bracket 306, 308 with two legs extending along the sides of the bracket 306, 308. Other clamp embodiments may use other shapes to attach to the brackets. In one embodiment, the support structure 237 attaches the suspension assembly 228 (of FIG. 2) to the rest of the head bar assembly 300. The VCM 210 (of FIG. 2) can move the head bar assembly 300 through the support structure 237.

Several cutouts 336, 338 may be formed in the support structure 237 to lighten the weight and/or to provide space for additional components. For example, components, such as portions of the VCM 210, may lie in a cutout 336. The cutouts may also provide easier access to portions of the head bar assembly 300. For example, the FPCs 318, 319 may route though the a cutout 338 to connect to the back of the head bar 220.

FIG. 3C illustrates a side view of the head bar assembly 300. For clarity, a few of the components such as the FPCs 318, 319 have been left out. In the illustrated embodiment, the support structure 237 includes an upper leg connected to the upper clamp 332 and a lower leg connected to the lower clamp 334. The upper clamp 332 connects to the upper bracket 306 of the housing body 310 and the lower clamp 334 connects to the lower bracket 308 of the housing body 310. The housing body is then connected to the head bar 220 via the flat springs 302, 304.

FIG. 3D illustrate a top view of the head bar assembly 300. As shown, the FPCs 318, 319 route through the open spaces formed by cutouts in the support structure 237 to attached to the head bar 220. While the illustrated embodiment shows two FPCs, other embodiments may use a different number of FPCs, such as one FPC or three or more FPCs.

Figure 4:
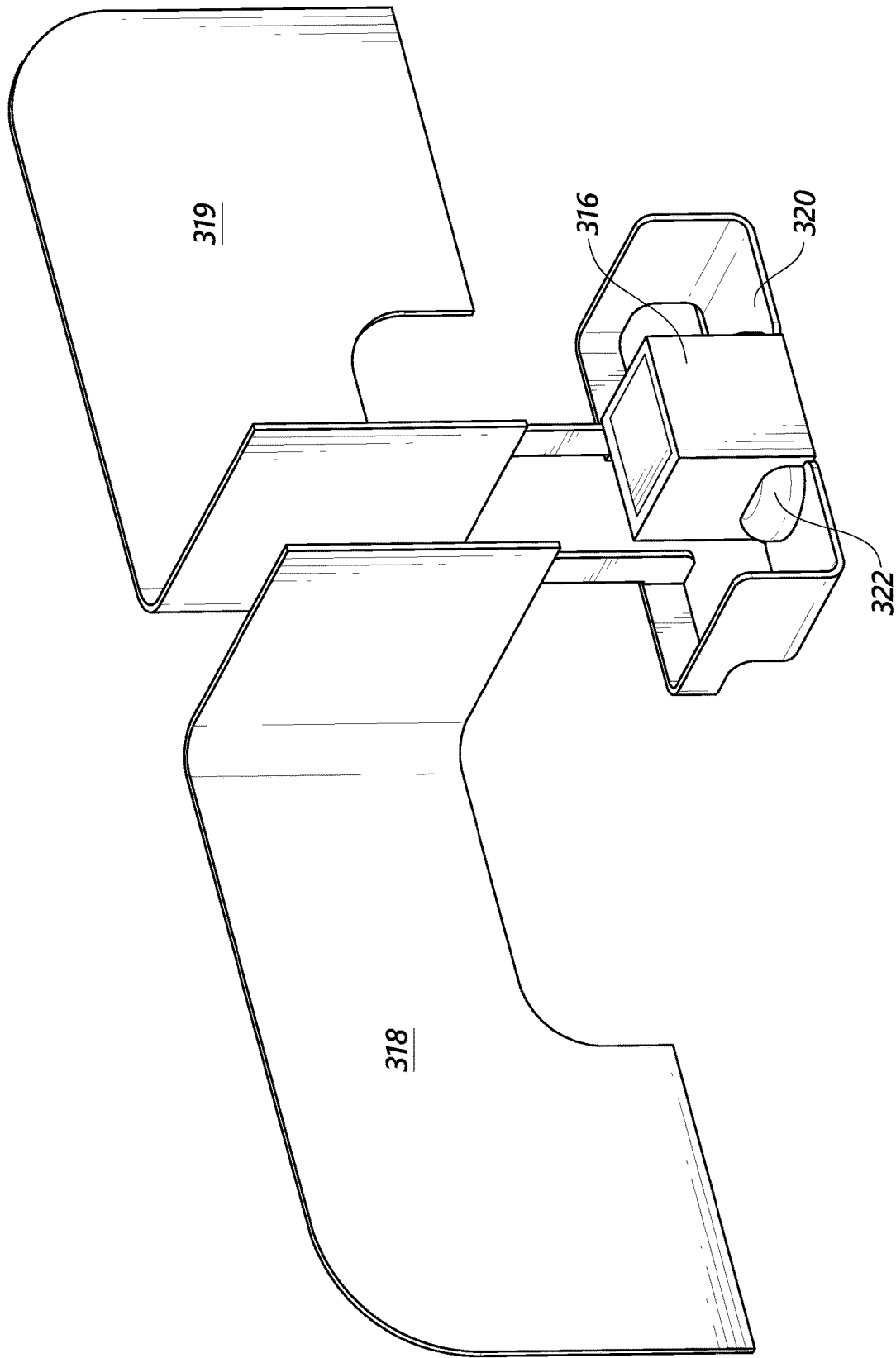
FIG. 4 illustrates a perspective view of flexible printed circuits forming an electrical connection with a piezoelectric actuator of the head bar assembly of FIGS. 3A-3D, according to certain embodiments.

FIG. 4 illustrates a perspective view of the FPCs 318, 319 forming an electrical connection with the piezoelectric actuator 316 of the head bar assembly 300. As shown, the left FPC 318 is connected by a thin linking section connected to the FPC material 320 lining the lower recess 314 formed by the lower bracket 308. Likewise, the FPC 319 is connected by a thin linking section to the FPC material 320. The FPC material 320 can be connected to the piezoelectric actuator 316 through conductive adhesive 322 or other type of conductive material. Beneficially, using conductive adhesive 322 serves a dual purpose of mechanically attaching the piezoelectric actuator to the FPC material 320 while also forming an electrical connection. As described above, a component, such as the storage controller, can send signals to control the piezoelectric actuator 316 through, for example, either of the FPCs 318, 319, the thin linking sections, the FPC material 320, and the conductive adhesive 322.

Figure 5:
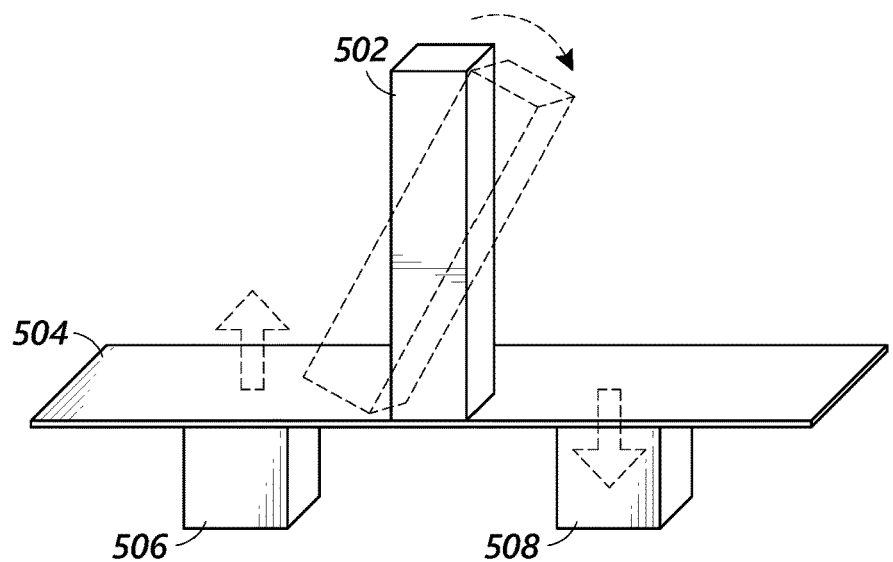
FIG. 5 illustrates an embodiment of a head bar assembly with dual actuators, according to certain embodiments.

FIG. 5 illustrates an embodiment of a head bar assembly 500 with dual actuators, according to certain embodiments. For ease of explanation, other components of the head bar assembly have been left out, though similar components as describes in earlier figures can be used. In the illustrated embodiment, a head bar 502 is attached to one side of a flat spring 504 while a first piezoelectric actuator 506 and a second piezoelectric actuator 508 are attached on the other side of the flat spring 504. In the illustrated embodiment, the flat spring is a lower flat spring with the piezoelectric actuators 506, 508 located below the head bar 502. However, in another embodiment, the flat spring is an upper flat spring with the piezoelectric actuators 506, 508 located below the head bar 502.

With two actuators 506, 508 beside and apart from each other, the actuators can apply opposing forces on the flat spring 504, for example, by applying inverse voltages to the two actuators. As shown by the arrows in FIG. 5, an upward force (push) may be applied by the first actuator 506 while a downward force (pull) may be applied by the second actuator 508. One actuator can push against one section of the flat spring while the other actuator pulls on another section of the flat spring. The opposing forces create a deflection in the surface of the flat spring 504, causing the attached head bar 502 to partially rotate (e.g., in a clockwise rotation). Reversing the forces applied by the two actuators (downward at first actuator, upward at second actuator) can cause the head bar 502 to rotate in the opposite direction (e.g., in a counter-clockwise direction). While the above has described the actuators as apart from each other, other embodiments may place the actuators beside each other, for example, if space is constrained and/or only a limited amount of deflection is needed.

By allowing the head bar 502 to rotate, the head bar assembly 500 may provide better reading or writing performance in the tape media. As tape media is a flexible material, the tape media may bend, tilt, or otherwise deform while passing by the head bar 502. Such deformation may cause the track being read to become offset from the read or write head. Rotating the head bar 502 can compensate for the deformation, allowing the read or write head to maintain its position over a data track.

Figure 6:
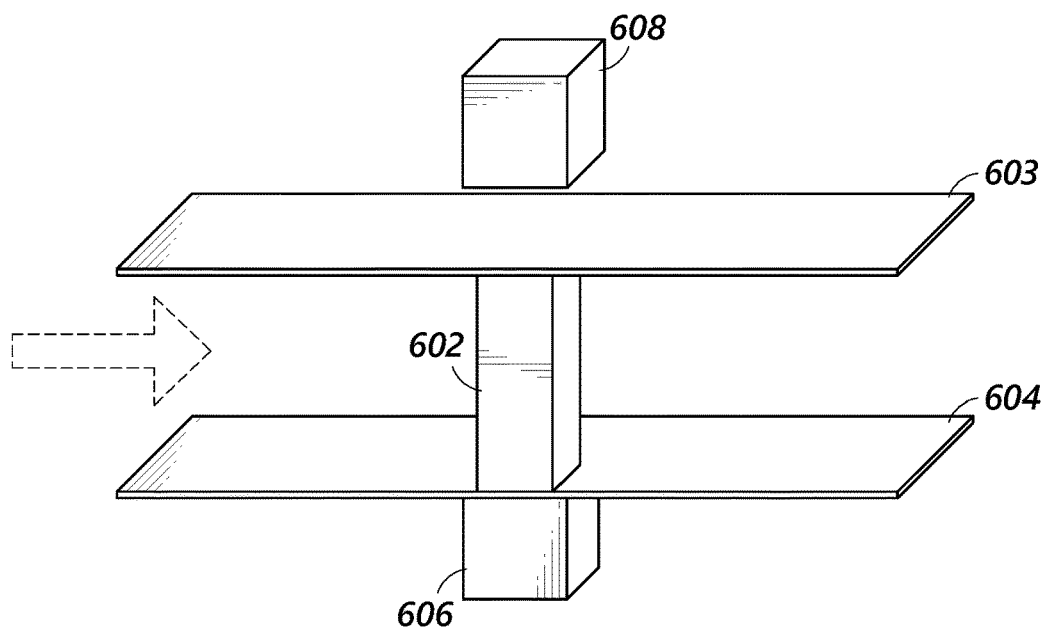
FIG. 6 illustrates an embodiment of a head bar assembly with a dummy mass opposite a first actuator, according to certain embodiments

FIG. 6 illustrates an embodiment of a head bar assembly 500 with a dummy mass opposite a first actuator, according to certain embodiments. As shown, a head bar 602 is suspended between a first flat spring 603 and a second flat spring 604. A first piezoelectric actuator 606 is below the head bar, while a dummy mass 608 is located above the head bar 602. In the illustrated embodiment, the piezoelectric actuator 606 is attached to a lower attachment bracket (not shown), with the piezoelectric actuator 606 on an opposite side of the second flat spring 604 from a lower end of the head bar 602. The dummy mass 608 is attached to an upper attachment bracket (not shown), with the dummy mass 608 on an opposite side of the first flat spring 603 from an upper end of the head bar 602. As the dummy mass 608 does not actuate the first flat spring 603, it does not have to be attached to the first flat spring. It may simply abut against or lie near the first flat spring 603 without being attached. In some embodiments, the dummy mass 608 may be spaced away from the first flat spring 603, with the dummy mass coming into contact with the first flat spring 603 when an upward force is applied to the head.

By locating the dummy mass 608 on an opposite side of the head bar 602 from the piezoelectric actuator 606, the suspension system for the head bar 602 may provide greater stiffness against external force. For example, if an external force applied an upward force on the head bar 602, the dummy mass 608 can prevent the head bar 602 from moving upwards past a certain point. The dummy mass may also serve as ballast to balance the weight of the head assembly, compensating for the weight of other components (e.g., such as the piezoelectric actuator 606 located on the other end of the head bar 602). The dummy mass may also prevent head housing resonance from going lower by serving as a damper.

As will be apparent, the location of the dummy mass 608 can also be reversed while providing a similar benefit as described above. By placing the dummy mass 608 below the head bar 602 while the piezoelectric actuator 606 is above the head bar 602, the dummy mass 608 can prevent the head bar 602 from moving downwards past a certain point. The dummy mass located below the head bar may also serve as a ballast or damper, as discussed above.

Dimension Considerations

Figure 7:
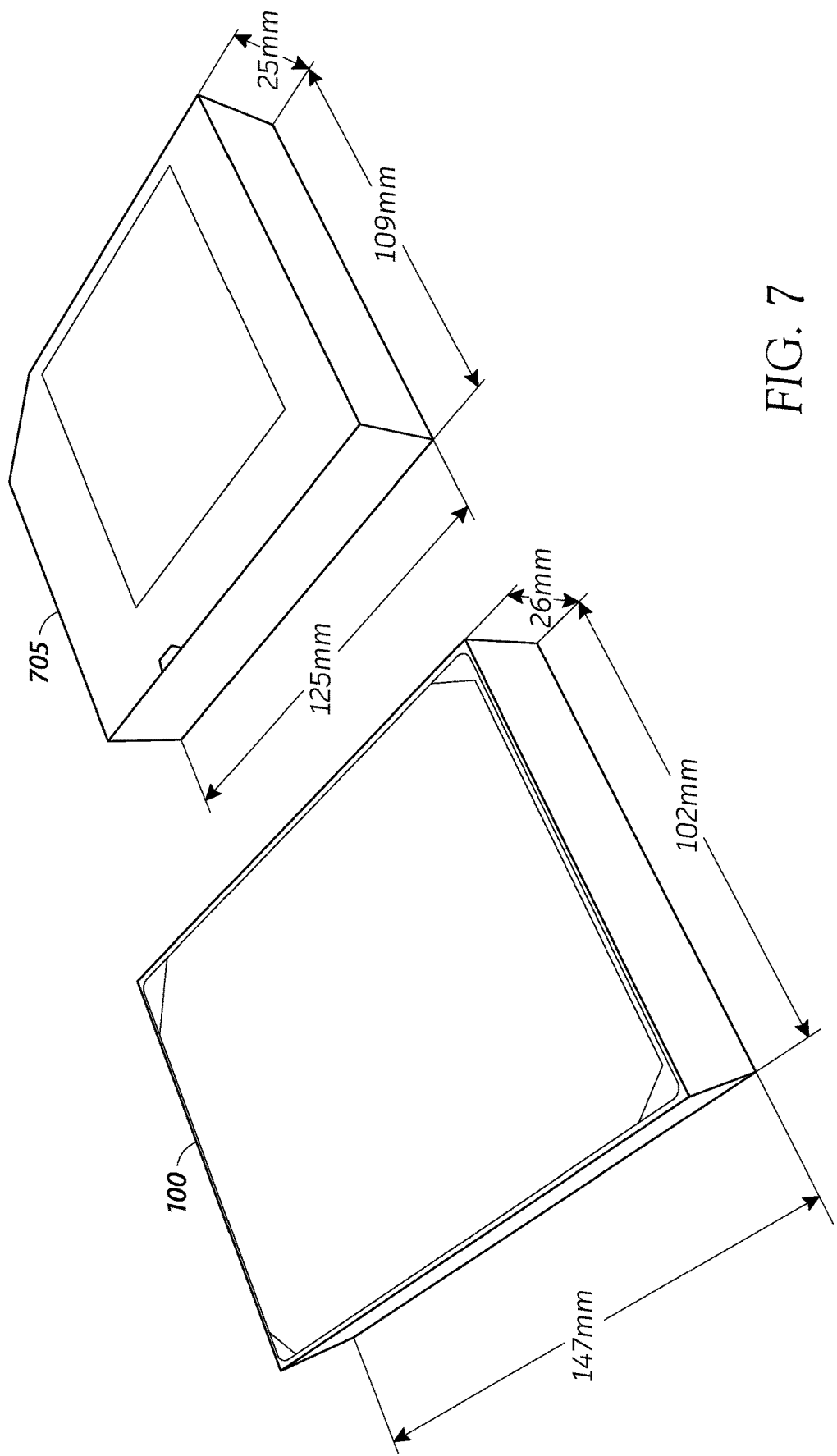
FIG. 7 illustrates a perspective view of a 3.5 inch form factor tape embedded drive 100 and an LTO tape cassette, according to certain embodiments.

FIG. 7 illustrates a perspective view of a 3.5 inch form factor tape embedded drive 100 and an LTO tape cassette, according to certain embodiments. In some embodiments the tape drive 100 may utilize an LTO format, while the tape embedded drive 100 may utilize a 3.5. inch form factor. In one embodiment, the tape embedded drive 100 has a length of 147 mm, a width of 102 mm and a height of 26 mm. An LTO cassette 705 has dimensions of a length of 125 mm, a width of 109 mm and a height of 25 mm. While the above discloses one set of possible dimensions for the tape embedded drive, other embodiments may have different dimensions. For example, the height might be doubled or otherwise increased (e.g., to about 52 mm) to allow larger tape film with a larger data capacity to be used.

The size (length×wide×height) of the tape embedded drive with PCBA can be optimized by access time and storage capacity. For faster access time, the tape film length should be shorter. Shorter tape film length can lead to shorter length and/or width size of the casing for the tape embedded drive, but at the potential cost of reduced total data capacity. For increased capacity, the casing can be lengthened in width and/or length to store longer total tape length, but at the potential cost of longer access time.

In some embodiments, the tape film width may be increased from the standard 12.65 mm used in LTO cassettes to a wider film. Increasing the tape width can increase capacity without necessarily having much effect on access time, as the overall tape length can stay the same.

Table 1 illustrates one possible embodiment for the tape film measurements of the tape embedded drive 100, in comparison to LTO tape measurements. Based on tape thickness, tape length can be calculated to be about 592 m, which is about 60% of the length of a standard LTO tape film. For reference, current LTO tape cassette (125 mm×109 mm×25 mm) has about 960 m of tape film length in the cassette (LTO-7 spec).

TABLE 1

|  | LTO-7 | Tape embedded drive |
|---|---|---|
| Outer diameter (mm) | 91.9 | 68.0 |
| Inner diameter (mm) | 40.0 | 20.0 |
| Tape thickness (μm) | 5.6 | 5.6 |
| Tape length (m) | 960 | 592 |

In an LTO cassette, with a 7 m/s tape wind up and a tape length of 1098 m, the average seek time is about 1098/3/7~=52 s, assuming that a ⅓ length seek time represents average seek time. Assuming an average robotics handling speed in the library system of 50 s, then total average data access time is about 100 s. On the other hand, some embodiments of the tape embedded drive, in a 3.5 inch form factor, can have an access time of 592/3/20 ~=10 s for average seek time. With a shorter tape length and hence smaller tape mass, 10 m/s, 15 m/s, and 20 m/s tape wind up could be achieved. Further, there may be no or at least less backlash due to inertial rotation from each tape reel motor.

While the above discusses the tape embedded drive 100 as having a casing with a 3.5 inch form factor like that of HDDs, the tape embedded drive 100 can use other form factors. For example, if tape technology becomes sufficiently miniaturized in the future, then the tape embedded drive could use a 2.5 inch drive form factor, like that used by laptop HDDs. In some embodiments where larger sizes are desired, the tape embedded drive 100 can use a 5.25 drive form factor for the casing, such as that used by computer CD-ROMs. Further, the tape embedded drive 100 can use the 3.5 inch form factor with some variations. For example, the drive may be slightly longer/shorter, slightly thicker/thinner, or the like. Even with slight differences in dimensions or placement of data/power interfaces, the drive 100 may still be compatible with existing 3.5 inch based infrastructure found in various computer equipment, such as racks and servers.

Figure 8:
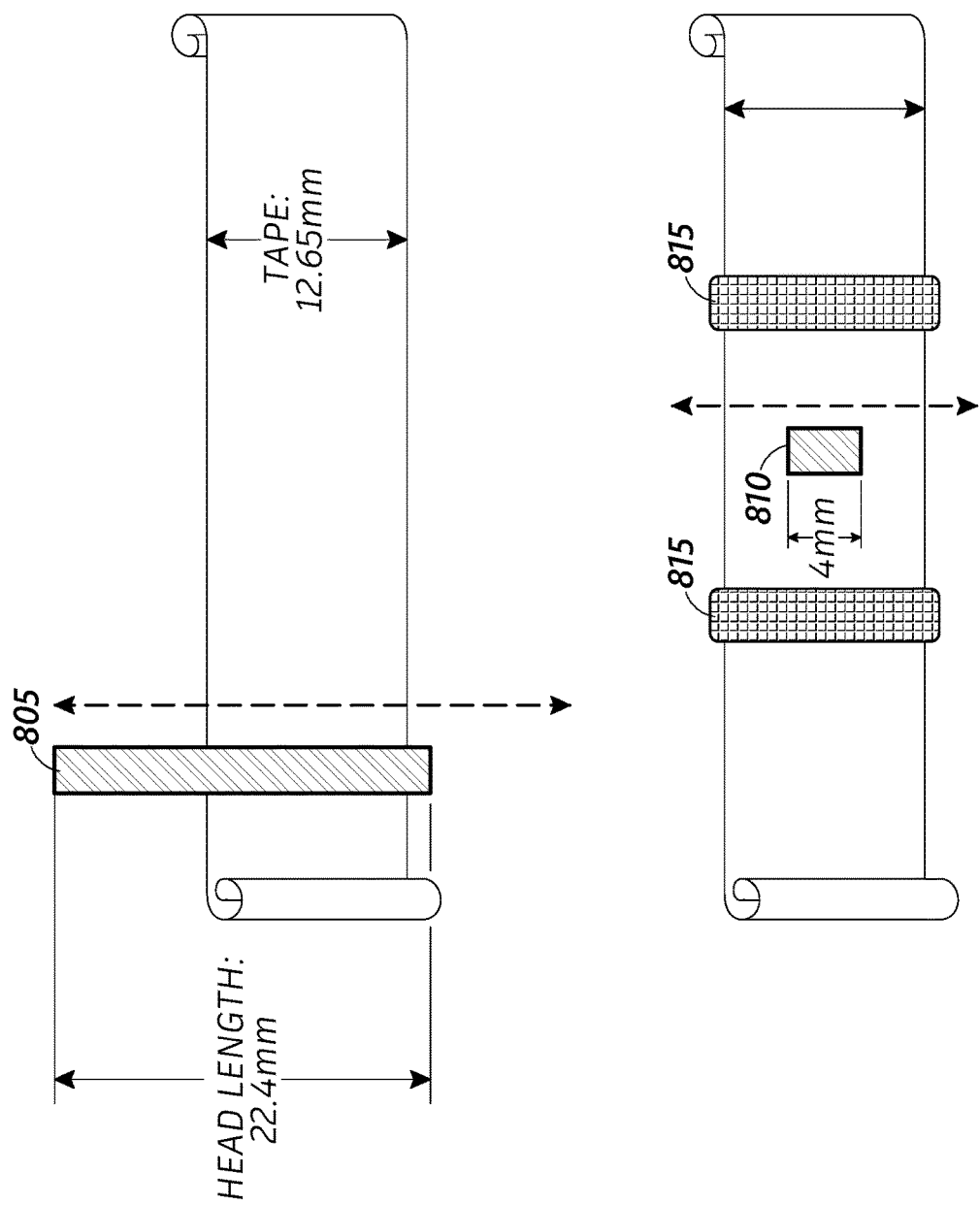
FIG. 8 illustrates an LTO head bar 805 and a head bar 810 for the tape embedded drive 100, according to certain embodiments.

FIG. 8 illustrates an LTO head bar 805 and a head bar 810 for the tape embedded or tape drive 100, according to certain embodiments. LTO cassettes only have a stepping motor and a voice coil motor to actuate the head bar. FIG. 8 shows the relationship between tape width and tape head bar length for LTO and for an embodiment of the tape embedded or tape drive.

Multiple writers and readers can be located in a head bar. For example, a tape bar could have 1-10 reader heads and/or 1-10 writer heads. Some head bars may have up to 16 readers and/or writers at a distance of 80 nm from each other. Typically, a tape head bar uses a writer-reader-writer layout. However, other layouts, such as writer-reader-reader-writer could be used. In some embodiments, using two or more readers provides better signal-to-noise ratio (SNR), allowing for higher TPI.

Tape recording uses head film contact technology for recording. Typically, an LTO tape uses four data bands on the film, in which the head(s) are moved to four different locations up and down the width of the tape. The stepping motor is used to move to each of the four locations, with the voice coil motor handling finer actuation within each location. Thus, an LTO cassette uses a longer head bar length (e.g. 22.4 mm) than the tape width (12.65 mm) so that the tape width is covered by the head bar in each of the four locations it may move to.

Due to the heavy mass of the longer head bar 805, wider head reader width and limited movement granularity of the stepping and voice coil motors, the track density on the film for an LTO cassette is limited. An LTO-7 track pitch is 10.7k TPI (2.37 um).

In one embodiment, the tape embedded or tape drive 100 comprises a significantly smaller head bar 810 than an LTO head bar 805, such as a head bar 810 of about 4 mm in length. Other head bar embodiments may be 5-7 mm, though some embodiments may be larger or smaller. With a shorter head bar length and corresponding less mass, the head bar can be moved up and down by PZT ultra-fine actuation. In an embodiment, the head assembly is attached to the PZT actuator (as discussed in FIG. 5), which is located on an assembly attached to an actuatable portion of the voice coil motor, which in turn is on an assembly attached to an actuatable portion of the stepping motor. In one embodiment, the PZT actuator is moved by the voice coil motor and the voice coil motor is in turn moved by the stepping motor.

While the above discusses head bar sizes of about 4 mm, other sizes are possible, such as about 3 mm, about 5 mm or even other sizes. In some embodiments, the head bar is significantly smaller than the tape width. For example, the head bar may be less than half or even less than a quarter of the width of the tape media.

In one embodiment, two tape guides 815 are located on both sides of the tape assembly. The tape guides limit the movement of the tape and provide better stability when the head assembly is moving over the tape film. In other embodiments, only a single tape guide placed either before or after the head assembly may be utilized.

In some embodiments, the head bar 810 can be supported by an HDD-like gimbal assembly or suspension assembly. This can provide gentler and/or more stable head to film contact, potentially providing better reliability for reading and/or writing. The suspension assembly could use a variety of materials, such as stainless steel or the like.

Control System

Figure 9:
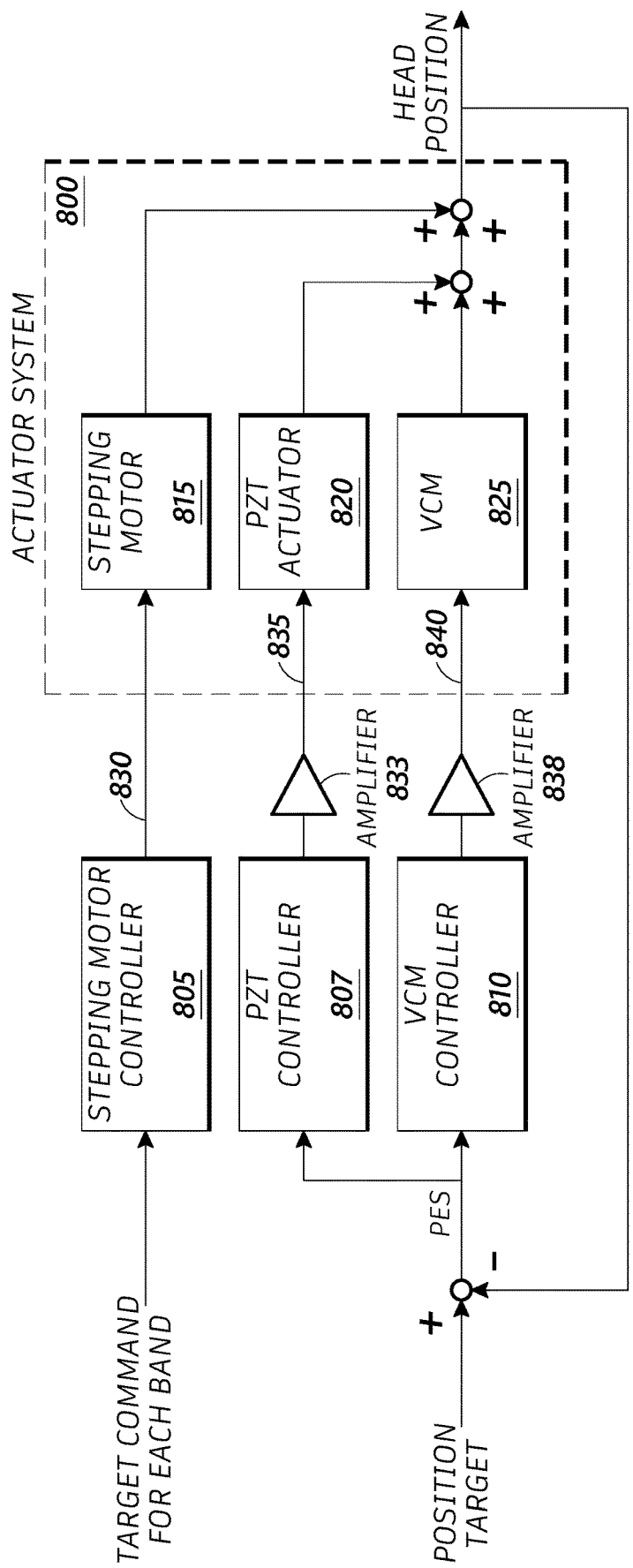
FIG. 9 illustrates a control block diagram for a servo-mechanical system of the tape embedded drive, according to certain embodiments.

FIG. 9 illustrates a control block diagram for a servo-mechanical system 900 of the tape embedded drive or tape drive 100, according to certain embodiments. The control logic for the system may be implemented as a process in one or more controllers of the tape embedded or tape drive 100, such as the SoC and/or PLSI in the PCBA and used to control one or more motors and/or actuators.

In an embodiment, a stepping motor controller 905, a PZT controller 907 and a VCM controller 910 work together to control a stepping motor 915, a PZT actuator 920, and a VCM 925 to coordinate the movement of the head(s) in response to a target command.

As discussed above, the stepping motor 915 can provide coarse movement, the VCM 925 can provide fine movement, and the PZT actuator 920 can provide very fine movement. For example, assuming a 12.65 mm tape width, the stepping motor stroke may be about 12.65 mm, with the VCM stroke at about 4 mm, and the PZT stroke at about 0.4 µm. In this embodiment, that creates a movement ratio of about 30,000:10,000:1 (stepping motor/VCM/PZT actuator). In other embodiments, the ratios could be different based on the performance specification of the motors and actuators.

A first control signal 930 is sent from the stepping motor controller to the stepping motor. The head(s) are then moved in a coarse movement. In an embodiment, a head position sensor detects the heads' position after the first movement and provides a positive error signal (PES) to the VCM and PZT controllers. In response, the VCM and PZT controllers can further move the head(s) in a fine and a very fine movement respectively, if needed, to place the head(s) into the desired position.

A first amplifier 933 can be positioned in between the PZT controller 907 and the PZT actuator 920 to amplify a second control signal 935. A second amplifier 938 can be positioned in between the VCM controller 910 and the VCM 925 to amplify a third control signal 940.

In an embodiment, the PZT actuator 920 and VCM 925 move the head(s) serially. The VCM first moves the head(s) and then, if the head(s) are within a first threshold distance from the target position, the PZT actuator 920 can take over movement of the head(s) for very fine movements. In another embodiment, the PZT actuator 920 and the VCM 925 may move the head(s) in parallel. It should be noted that although PZT is used throughout in the description of the control system of FIG. 9, as disclosed above other types of actuators may be used in place of PZTs, and the system of FIG. 9 can be adapted accordingly in other embodiments.

Additional Embodiments

Those skilled in the art will appreciate that in some embodiments, other types of tape embed drive systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A storage device comprising:
a head assembly comprising:
a support structure;
a head housing attached to the support structure, the head housing having an upper attachment bracket and a lower attachment bracket;
a first flat spring attached to the upper attachment bracket;
a second flat spring attached to the lower attachment bracket;
a head bar comprising at least one read head and at least one write head, the head bar attached on an upper side to the first flat spring, the head bar attached on a lower side to the second flat spring, the head bar suspended between the first flat spring and the second flat spring;
a first piezoelectric actuator attached to the lower attachment bracket, the first piezoelectric actuator on an opposite side of the second flat spring from the lower side of the head bar, the first piezoelectric actuator configured to actuate the head bar by moving the second flat spring that is attached to the head bar; and
a second piezoelectric actuator configured to actuate the head bar, the second piezoelectric actuator attached to the lower attachment bracket, the second piezoelectric actuator on the opposite side of the second flat spring from the lower side of the head bar, the second piezoelectric actuator beside and apart from the first piezoelectric actuator; and
one or more motors configured to actuate the head assembly;
wherein the head bar is attached to a section of the second flat spring between the first piezoelectric actuator and the second piezoelectric actuator.

2. The storage device of claim 1, wherein the first piezoelectric actuator and the second piezoelectric actuator are configured to partially rotate the head bar by having one piezoelectric actuator push the second flat spring while the other piezoelectric actuator pulls the second flat spring.

3. The storage device of claim 1, wherein the first piezoelectric actuator comprise a lead zirconate titanate (PZT) material.

4. The storage device of claim 1, further comprising: one or more tape reels comprising tape media for storing data; and a casing comprising an interior cavity, the interior cavity holding the one or more tape reels, the head assembly, and the one or more motors.

5. The storage device of claim 4, further comprising:
a printed circuit board assembly (PCBA) mounted on an external surface of the casing, the PCBA electrically connected to the one or more motors and configured to control operations of the one or more motors.

6. The storage device of claim 1, further comprising:
a first piezoelectric actuator configured to actuate the head bar, the first piezoelectric actuator attached to the upper attachment bracket, the first piezoelectric actuator on an opposite side of the first flat spring from the upper side of the head bar.

7. A storage device comprising:
a head assembly comprising:
a support structure;
a head housing attached to the support structure, the head housing having an upper attachment bracket and a lower attachment bracket;
a first flat spring attached to the upper attachment bracket;
a second flat spring attached to the lower attachment bracket;
a head bar comprising at least one read head and at least one write head, the head bar attached on an upper side to the first flat spring, the head bar attached on a lower side to the second flat spring, the head bar suspended between the first flat spring and the second flat spring; and
a first piezoelectric actuator configured to actuate the head bar, the first piezoelectric actuator attached to the lower attachment bracket, the first piezoelectric actuator on an opposite side of the second flat spring from the lower side of the head bar; and
one or more motors configured to actuate the head assembly;
wherein a dummy mass is attached to the upper attachment bracket, the dummy mass on an opposite side of the first flat spring from the upper side of the head bar.

8. The storage device of claim 7, wherein the first piezoelectric actuator is configured to actuate the head bar by moving the second flat spring attached to the lower side of the head bar.

9. The storage device of claim 8, further comprising:
a second piezoelectric actuator configured to actuate the head bar, the second piezoelectric actuator attached to the lower attachment bracket, the second piezoelectric actuator on the opposite side of the second flat spring from the lower side of the head bar, the second piezoelectric actuator beside and apart from the first piezoelectric actuator;

wherein the head bar is attached to a section of the second flat spring between the first piezoelectric actuator and the second piezoelectric actuator.

10. The storage device of claim 9, wherein the first piezoelectric actuator and the second piezoelectric actuator are configured to partially rotate the head bar by having one piezoelectric actuator push the second flat spring while the other piezoelectric actuator pulls the second flat spring.

11. A head assembly for reading or writing to tape media in a tape drive, the head assembly comprising:
  a support structure;
  a head housing attached to the support structure, the head housing having an upper attachment bracket and a lower attachment bracket;
  a first flat spring attached to the upper attachment bracket;
  a second flat spring attached to the lower attachment bracket;
  a head bar comprising at least one read head and at least one write head, the head bar attached on an upper side to the first flat spring, the head bar attached on a lower side to the second flat spring, the head bar suspended between the first flat spring and the second flat spring;
  a first piezoelectric actuator attached to the lower attachment bracket, the first piezoelectric actuator on an opposite side of the second flat spring from the lower side of the head bar, the first piezoelectric actuator configured to actuate the head bar by moving the second flat spring that is attached to the head bar; and
  a second piezoelectric actuator configured to actuate the head bar, the second piezoelectric actuator attached to the lower attachment bracket, the second piezoelectric actuator on the opposite side of the second flat spring from the lower side of the head bar, the second piezoelectric actuator beside and apart from the first piezoelectric actuator;
  wherein the head bar is attached to a section of the second flat spring between the first piezoelectric actuator and the second piezoelectric actuator.

12. The head assembly of claim 11, wherein the first piezoelectric actuator and the second piezoelectric actuator are configured to partially rotate the head bar by having one piezoelectric actuator push the second flat spring while the other piezoelectric actuator pulls the second flat spring.

13. The head assembly of claim 11, wherein the head assembly is incorporated within a housing of a storage device.

14. A head assembly for reading or writing to tape media in a tape drive, the head assembly comprising:
  a support structure;
  a head housing attached to the support structure, the head housing having an upper attachment bracket and a lower attachment bracket;
  a first flat spring attached to the upper attachment bracket;
  a second flat spring attached to the lower attachment bracket;
  a head bar comprising at least one read head and at least one write head, the head bar attached on an upper side to the first flat spring, the head bar attached on a lower side to the second flat spring, the head bar suspended between the first flat spring and the second flat spring; and
  a first piezoelectric actuator configured to actuate the head bar, the first piezoelectric actuator attached to the lower attachment bracket, the first piezoelectric actuator on an opposite side of the second flat spring from the lower side of the head bar;
  wherein a dummy mass is attached to the upper attachment bracket, the dummy mass on an opposite side of the first flat spring from the upper side of the head bar.

15. The head assembly of claim 14, wherein the first piezoelectric actuator is configured to actuate the head bar by moving the second flat spring attached to the lower side of the head bar.

16. The head assembly of claim 15, further comprising:
  a second piezoelectric actuator configured to actuate the head bar, the second piezoelectric actuator attached to the lower attachment bracket, the second piezoelectric actuator on the opposite side of the second flat spring from the lower side of the head bar, the second piezoelectric actuator beside and apart from the first piezoelectric actuator;
  wherein the head bar is attached to a section of the second flat spring between the first piezoelectric actuator and the second piezoelectric actuator.

17. The head assembly of claim 16, wherein the first piezoelectric actuator and the second piezoelectric actuator are configured to partially rotate the head bar by having one piezoelectric actuator push the second flat spring while the other piezoelectric actuator pulls the second flat spring.

18. A storage device comprising:
  a head assembly comprising:
    means for suspending a head bar between a first flat spring and a second flat spring;
    the head bar comprising at least one read head and at least one write head, the head bar attached on an upper side to the first flat spring, the head bar attached on a lower side to the second flat spring;
    means for actuating the head assembly;
    a first piezoelectric actuator attached to the means for suspending the head bar, the first piezoelectric actuator on an opposite side of the second flat spring from the lower side of the head bar, the first piezoelectric actuator configured to actuate the head bar by moving the second flat spring that is attached to the head bar; and
    a second piezoelectric actuator configured to actuate the head bar, the second piezoelectric actuator attached to means for suspending the head bar, the second piezoelectric actuator on the opposite side of the second flat spring from the lower side of the head bar, the second piezoelectric actuator beside and apart from the first piezoelectric actuator;
    wherein the head bar is attached to a section of the second flat spring between the first piezoelectric actuator and the second piezoelectric actuator.

19. The storage device of claim 18, further comprising:
  one or more tape reels comprising tape media for storing data; and
  a casing comprising an interior cavity, the interior cavity holding the one or more tape reels and the head assembly.

* * * * *